(12) United States Patent
Lee et al.

(10) Patent No.: US 9,077,033 B2
(45) Date of Patent: Jul. 7, 2015

(54) ANODE ACTIVE MATERIAL AND LITHIUM SECONDARY BATTERY COMPRISING THE SAME

(71) Applicant: LG CHEM, LTD., Seoul (KR)

(72) Inventors: SeongMin Lee, Seoul (KR); SooHyun Lim, Daejeon (KR); Tae Jin Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 203 days.

(21) Appl. No.: 13/863,609

(22) Filed: Apr. 16, 2013

(65) Prior Publication Data
US 2013/0316223 A1     Nov. 28, 2013

(30) Foreign Application Priority Data

Apr. 16, 2012 (KR) .................. 10-2012-0038902

(51) Int. Cl.
*H01M 4/485* (2010.01)

(52) U.S. Cl.
CPC .............. *H01M 4/485* (2013.01); *Y02E 60/122* (2013.01)

(58) Field of Classification Search
CPC ............................. Y02E 60/122; H01M 4/485
USPC .............................................. 429/163, 231.95
See application file for complete search history.

(56) References Cited

U.S. PATENT DOCUMENTS 5,707,756 A * 1/1998 Inoue et al. ..................... 429/57
6,183,908 B1 * 2/2001 Miyasaka et al. .......... 429/218.1

* cited by examiner

*Primary Examiner* — Stewart Fraser
(74) *Attorney, Agent, or Firm* — Birch, Stewart, Kolasch & Birch, LLP

(57) ABSTRACT

Disclosed is an anode active material for secondary batteries enabling intercalation and deintercalation of lithium ions, the anode active material comprising lithium metal oxide containing a halogen atom.

13 Claims, 2 Drawing Sheets
(2 of 2 Drawing Sheet(s) Filed in Color)

ary battery, and an anode active material
constituting the secondary battery.

BACKGROUND ART

Depletion of fuel cells has brought about a great increase in price of energy sources and increased interest in environmental pollution. Eco-friendly alternative energy sources are a necessity for the next generation. In this regard, a great deal of research into power production methods such as nuclear energy, sunlight, wind power and tidal power is underway and power storage devices for efficiently utilizing the produced energy also attract much attention.

In particular, regarding lithium secondary batteries, an increase in technological development and demand associated with mobile equipment has led to a sharp increase in demand for lithium secondary batteries as energy sources. Recently, use of lithium secondary batteries as power sources of electric vehicles (EVs) and hybrid electric vehicles (HEVs) has become popularized and usage thereof is expanding to applications such as auxiliary power supply through grid-realization.

An anode of a conventional lithium secondary battery generally utilizes a carbon-based compound which enables intercalation and deintercalation of reversible lithium ions while maintaining structural and electrical properties as an anode active material. On the other hand, recently, rather than conventional carbon-based anode materials, a great deal of research associated with anode materials and lithium metal oxides obtained through lithium alloy reaction using silicon (Si) and tin (Sn) is actively underway.

Lithium titanium oxide ($Li_4Ti_5O_{12}$) is known as a zero-strain material that suffers minimal structural deformation during charge/discharge, exhibits considerably superior lifespan, does not cause generation of dendrites and has considerably superior safety and stability. In addition, lithium titanium oxide electrodes are greatly advantageous as they can be quickly charged within several minutes.

DISCLOSURE

Technical Problem

Lithium titanium oxide may undergo local structural deformation due to instability of oxygen atoms in abnormal operation states such as over-charge and over-discharge. Such structural deformation may be an irreversible reaction which may cause negative effects such as generation of a great amount of gas or decrease in capacity.

It is an object of the present invention to improve structural stability of lithium metal oxide by substituting a part of oxygen atoms constituting lithium metal oxide by a halogen atom.

Technical Solution

In accordance with one aspect of the present invention, provided is an anode active material comprising a lithium metal oxide enabling intercalation and deintercalation of lithium ions. The lithium metal oxide may comprise a halogen atom.

Specifically, a part of oxygen of the lithium metal oxide may be substituted by a halogen atom.

Specifically, the lithium metal oxide is preferably represented by the following Formula (1):

$$Li_aM'_bO_{4-c}A_c \quad (1)$$

wherein M' is at least one element selected from the group consisting of Ti, Sn, Cu, Pb, Sb, Zn, Fe, In, Al and Zr;
a and b are determined according to an oxidation number of M' within ranges of $0.1 \leq a \leq 4$ and $0.2 \leq b \leq 4$;
c is determined according to an oxidation number within a range of $0 < c < 0.2$; and
A is at least one negative univalent or bivalent anion.

The oxide of Formula (1) is represented by the following Formula (2):

$$Li_aTi_bO_{4-c}A_c \quad (2)$$

wherein $0.5 \leq a \leq 3$ and $1 \leq b \leq 2.5$;
c is determined according to an oxidation number within a range of $0 < c < 0.2$; and
A is at least one negative univalent or bivalent anion.

The lithium metal oxide may be $Li_{0.8}Ti_{2.2}O_{4-c}A_c$, $Li_{2.67}Ti_{1.33}O_{4-c}A_c$, $LiTi_2O_{4-c}A_c$, $Li_{1.33}Ti_{1.67}O_{4-c}A_c$, $Li_{1.14}Ti_{1.71}O_{4-c}A_c$ or the like, but is not limited thereto.

In a non-limiting embodiment of the present invention, the lithium metal oxide may be $Li_{1.33}Ti_{1.67}O_{4-c}A_c$ or $LiTi_2O_{4-c}A_c$. $Li_{1.33}Ti_{1.67}O_{4-c}A_c$ has a spinel structure which undergoes little change in crystal structure during charge and discharge and is highly reversible.

The lithium metal oxide may be prepared by a method well-known in the art, for example, a solid phase method, a hydrothermal method, a sol-gel method or the like and a detailed explanation thereof is omitted.

The halogen atom may be contained in the lithium metal oxide by adding the halogen atom thereto during synthesis of the lithium metal oxide. Specifically, a titanium precursor containing fluorine may be used. Examples of the titanium precursor containing fluorine include sodium titanate, potassium titanate or cesium titanate such as $Na_2Ti_3(O,F)_7$, $K_2Ti_4(O,F)_9$, or $Cs_2Ti_5(O,F)_{12}$.

The lithium metal oxide may be provided as a secondary particle formed of agglomerated primary particles.

The secondary particle may have a particle diameter of 200 nm to 30 μm.

When the particle diameter of the secondary particles is less than 200 nm, anode adhesiveness may be deteriorated during production. In order to solve this problem, use of a greater amount of binder is required and energy density is disadvantageously low.

When the particle diameter of the secondary particle exceeds 30 μm, it is disadvantageously difficult to obtain high power due to low diffusion rate of lithium ions.

The halogen atom may be contained in lithium metal oxide by reacting lithium metal oxide particles with halogen or halogenide.

For example, lithium titanium oxide may be kept in fluorine gas, nitrogen trifluoride gas, chlorine trifluoride gas or mixture thereof with an inert gas for a predetermined time of period. At this time, fluorination level can be controlled by changing a partial pressure of the fluorine gas.

In addition, lithium titanium oxide may be treated with fluorine by immersing lithium titanium oxide in a fluorine-containing solution. Examples of the fluorine-containing solution include, but are not limited to, hydrofluoric acid.

The halogen atom may be at least one selected from the group consisting of fluorine (F), chlorine (Cl), bromine (Br), iodine (I), and astatine (At).

The halogen atom may be present in an amount of 0.1% by weight to 5% by weight, based on the total weight of the lithium metal oxide.

In addition to the lithium metal oxide represented by the following formula (1) above, the anode active material may further include carbon such as non-graphitized carbon and graphitized carbon; metal composite oxides such as $Li_xFe_2O_3$ ($0 \le x \le 1$), $Li_xWO_2$ ($0 \le x \le 1$) and $Sn_xMe_{1-x}Me'_yO_z$ (Me:Mn, Fe, Pb, Ge; Me':Al, B, P, Si, Group I, II and III elements of the Periodic Table, halogen atoms; $0 \le x \le 1$; $1 \le y \le 3$; and $1 \le z \le 8$); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The lithium metal oxide may be present in an amount not lower than 50% by weight and not higher than 100% by weight, based on the total weight of the anode active material.

The present invention provides an electrode assembly comprising an anode comprising the anode active material, a cathode and a polymer membrane, and having a structure in which the polymer membrane is interposed between the cathode and the anode.

The lithium secondary battery may comprise a lithium salt-containing non-aqueous electrolyte.

The lithium secondary battery may be a lithium ion battery, a lithium ion polymer battery or a lithium polymer battery.

The cathode or the anode may be fabricated by a method including the following processes.

The method for producing the electrode comprises:
dispersing or dissolving a binder in a solvent to prepare a binder solution;
mixing the binder solution with an electrode active material and a conductive material to prepare an electrode slurry;
coating the electrode slurry onto a current collector;
drying the electrode; and
pressing the electrode to a predetermined thickness.

In some cases, the method may further comprise drying the pressed electrode.

In the process of preparing the binder solution, the binder solution is prepared by dispersing or dissolving the binder in the solvent.

The binder may be any binder well known in the art and, specifically, the binder may be selected from the group consisting of fluorine resins, polyolefines, styrene butadiene rubbers, carboxymethyl cellulose, mussel proteins (dopamines), silanes, ethylcellulose, methylcellulose, hydroxypropylcellulose, polyethylene glycol, polyvinyl alcohol, and acrylic copolymers.

The solvent may be selected depending on the type of binder and examples thereof include organic solvents such as isopropyl alcohol, N-methylpyrrolidone (NMP), acetone, water and the like.

In a specific embodiment of the present invention, a binder solution for a cathode may be prepared by dispersing/dissolving PVdF in N-methylpyrrolidone (NMP).

An electrode slurry may be prepared by mixing the electrode active material and the conductive material with the binder solution or dispersing the electrode active material and the conductive material therein. The electrode slurry thus prepared is transported to a storage tank and stored prior to coating. The electrode slurry may be continuously stirred in the storage tank in order to prevent the electrode slurry from hardening.

Examples of the electrode active material include the lithium metal oxide represented by Formula (1); layered compounds such as lithium cobalt oxide ($LiCoO_2$) and lithium nickel oxide ($LiNiO_2$), or these compounds substituted by one or more transition metals; lithium manganese oxides such as compounds represented by $Li_{1+y}Mn_{2-y}O_4$ (in which $0 \le y \le 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-y}M_yO_2$ (M=Co, Mn, Al, Cu, Fe, Mg, B or Ga, and $0.01 \le y \le 0.3$); lithium manganese composite oxides represented by $LiMn_{2-y}M_yO_2$ (M=Co, Ni, Fe, Cr, Zn or Ta, and $0.01 \le y \le 0.1$), or $Li_2Mn_3MO_8$ (M=Fe, Co, Ni, Cu or Zn); $LiMn_2O_4$ wherein Li is partially substituted by alkaline earth metal ions; disulfide compounds; $Fe_2(MoO_4)_3$; carbon such as non-graphitized carbon and graphitized carbon; metal composite oxides such as $Li_xFe_2O_3$ ($0 \le x \le 1$), $Li_xWO_2$ ($0 \le x \le 1$) and $Sn_xMe_{1-x}Me'_yO_z$ (Me:Mn, Fe, Pb, Ge; Me':Al, B, P, Si, Group I, II and III elements of the Periodic Table, halogen atoms; $0 \le x \le 1$; $1 \le y \le 3$; and $1 \le z \le 8$); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

In a specific example of the present invention, the cathode may comprise lithium metal oxide having a spinel structure represented by the following Formula (3) and the anode may comprise lithium metal oxide represented by the following Formula (3):

$$Li_xM_yMn_{2-y}O_{4-z}A_z \quad (3)$$

wherein $0.9 \le x \le 1.2$, $0 < y < 2$, $0 \le z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one negative univalent or bivalent anion.

A maximum substitution amount of A is less than 0.2 mol %. In a specific embodiment, A may be at least one anion selected from the group consisting of halogens such as F, Cl, Br and I, S and N.

The substitution of the anions improves bonding force to the transition metal and prevents structural deformation of the compound, thus improving lifespan of the battery. On the other hand, when a substitution amount of the anion A is excessively high (t≥0.2), lifespan characteristics may be disadvantageously deteriorated due to incomplete crystal structure formation.

Specifically, the oxide of Formula (3) may be a lithium metal oxide represented by the following Formula (4):

$$Li_xNi_yMn_{2-y}O_4 \quad (4)$$

wherein $0.9 \le x \le 1.2$, and $0.4 \le y \le 0.5$.

More specifically, the lithium metal oxide may be $LiNi_{0.5}Mn_{1.5}O_4$ or $LiNi_{0.4}Mn_{1.6}O_4$.

Any conductive material may be used without particular limitation so long as it has suitable conductivity without causing adverse chemical changes in the battery. Examples of conductive materials include graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The electrode slurry may further comprise an additive such as a filler, as necessary.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Coating the current collector with the electrode slurry is a process of coating an electrode slurry to a given thickness on a current collector having a predetermined pattern by passing the electrode slurry through a coater head.

Coating the current collector with the electrode slurry is carried out by placing the electrode slurry on the current collector and then homogenizing the electrode slurry using a doctor blade. Coating methods may include die casting, comma coating or screen printing. In addition, the electrode slurry may be adhered to the current collector by pressing or lamination after forming the electrode slurry on a separate substrate.

There is no particular limit as to the current collector, so long as it has suitable conductivity without causing adverse chemical changes in the fabricated battery. Examples of the current collector include copper, stainless steel, aluminum, nickel, titanium, sintered carbon, and copper or stainless steel which has been surface-treated with carbon, nickel, titanium or silver, and aluminum-cadmium alloys. The cathode current collector may be processed to form fine irregularities on the surface thereof so as to enhance adhesion to the cathode active materials. In addition, the cathode current collectors may be used in various forms including films, sheets, foils, nets, porous structures, foams and non-woven fabrics. Specifically, the cathode current collector may be a metal current collector including aluminum and the anode current collector may be a metal current collector including copper. The electrode current collector may be a metal foil, an aluminum (Al) foil or a copper (Cu) foil.

In the drying process, the solvent and moisture present in the slurry are removed in order to dry the slurry coated on the metal current collector. In a specific embodiment, the drying may be carried out in a vacuum oven at 50 to 200° C. within one day.

After drying, the method may further include cooling. The cooling may include slow cooling at room temperature in order to facilitate recrystallization of the binder.

After completion of coating, the electrode may be compressed to a desired thickness by passing the electrode between two rolls heated to a high temperature in order to improve capacity density of the electrode and adhesivity between the current collector and the active material. This is referred to as a pressing process.

Before passing the electrode between two rolls heated to high temperature, the electrode may be pre-heated. In the pre-heating process, the electrode is heated before being added to the roll in order to improve compression effects of the electrode.

The pressed electrode may be dried in a vacuum oven at 50 to 200° C. which is a temperature not lower than a melting point of the binder, within one day. The pressed electrode may be dried after being cut to a predetermined length.

After drying, the method may further include cooling. The cooling may include slow cooling at room temperature in order to facilitate recrystallization of the binder.

The polymer membrane is a separator to isolate the cathode from the anode. When a solid electrolyte such as polymer is used as the electrolyte, the solid electrolyte may also serve as the separator.

As the separator, an insulating thin film having high ion permeability and mechanical strength is used. The separator typically has a pore diameter of 0.01 to 10 μm and a thickness of 5 to 300 μm.

As the separator, sheets or non-woven fabrics, or craft papers made of an olefin polymer such as polypropylene and/or glass fibers or polyethylene, which have chemical resistance and hydrophobicity, are used.

Typical examples of commercially available products for the separator may include Celgard series such as Celgard® 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

The electrode assembly may include all electrode assemblies with a structure well known in the art such as jellyroll electrode assemblies (or winding-type electrode assemblies), stack electrode assemblies (or lamination-type electrode assemblies) and stack & folding electrode assemblies.

In this specification, it will be understood that the stack & folding electrode assembly includes a stack & folding-type electrode assembly produced by placing a unit cell having a structure in which a separator is interposed between the cathode and the anode on a separator sheet, and folding or winding the separator sheet.

In addition, the electrode assembly may include an electrode assembly having a structure in which the cathode and the anode are laminated by heat-fusion such that one of the cathode and the anode is interposed between separators.

As the non-aqueous electrolyte, a non-aqueous electrolytic solution, an organic solid electrolyte and an inorganic solid electrolyte may be utilized.

Examples of the non-aqueous electrolytic solution that can be used in the present invention include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The lithium secondary batteries according to the present invention may be used for battery cells as power sources of small-sized devices and as unit batteries of middle- or large-sized battery modules comprising a plurality of battery cells.

In addition, the present invention provides a battery pack comprising the battery module as a power source of a medium or large sized device. Preferable examples of such medium or large sized devices include electric vehicles including electric vehicles (EVs), hybrid electric vehicles (HEVs) and plug-in hybrid electric vehicles (PHEVs), power storage systems and the like.

Configurations of battery modules and battery packs, and fabrication methods thereof are well known in the art and a detailed explanation thereof is thus omitted in this specification.

Effects of the Invention

As apparent from the fore-going, the anode active material according to the present invention advantageously comprises a lithium metal oxide containing a halogen atom, thus maintaining a spinel structure in even abnormal operation states such overcharge or overdischarge.

The lithium secondary battery comprising the anode active material according to the present invention is free of irreversible reaction caused by generation of oxygen, thus advantageously increasing capacity and improving lifespan.

BRIEF DESCRIPTION OF THE DRAWINGS

The patent or application file contains at least one color drawing. Copies of this patent or patent application publication with color drawings will be provided by the USPTO upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Now, the present invention will be described in more detail with reference to the following examples. These examples are provided only to illustrate the present invention and should not be construed as limiting the scope and spirit of the present invention.

Example 1

$Li_{1.33}Ti_{1.67}O_{3.9}F_{0.1}$ was prepared by exposing $Li_{1.33}Ti_{1.67}O_4$ to fluorine ($F_2$) gas.

A solid containing $Li_{1.33}Ti_{1.67}O_{3.9}F_{0.1}$, Super-P and PVdF at a weight ratio of 90:5:5 was mixed with NMP as a solvent to prepare an anode slurry. The anode slurry was coated onto an aluminum foil with a thickness of 20 μm to produce an electrode with a load of 1 mAh/cm².

A coin-type battery was produced using a lithium metal as a counter electrode, a polyethylene membrane (Celgard, thickness: 20 μm) as a separator, and a carbonate electrolyte consisting of EC:DMC:EMC at a ratio of 1:1:1, and 1M $LiPF_6$ as a salt.

Comparative Example 1

A coin-type battery was produced in the same manner as in Example 1, except that the weight ratio of $Li_{1.33}Ti_{1.67}O_4$, Super-P and PVdF was 90:5:5.

Experimental Example 1

Figure 1:
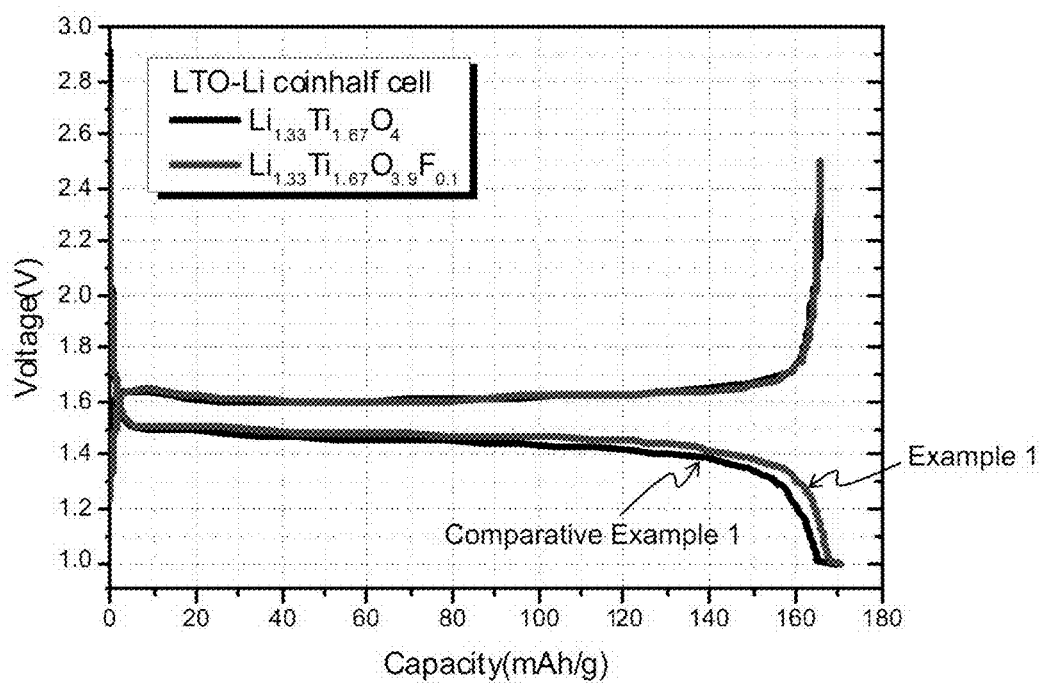
FIG. 1 is a curve showing charge and discharge of batteries according to non-limiting Examples and Comparative Examples of the present invention.

The batteries of Example 1 and Comparative Example 1 were subjected to charge and discharge testing under 0.1 C charge and 0.1 C discharge conditions. As can be seen from FIG. 1, Example 1 exhibited superior capacity to Comparative Example 1.

Experimental Example 2

Figure 2:
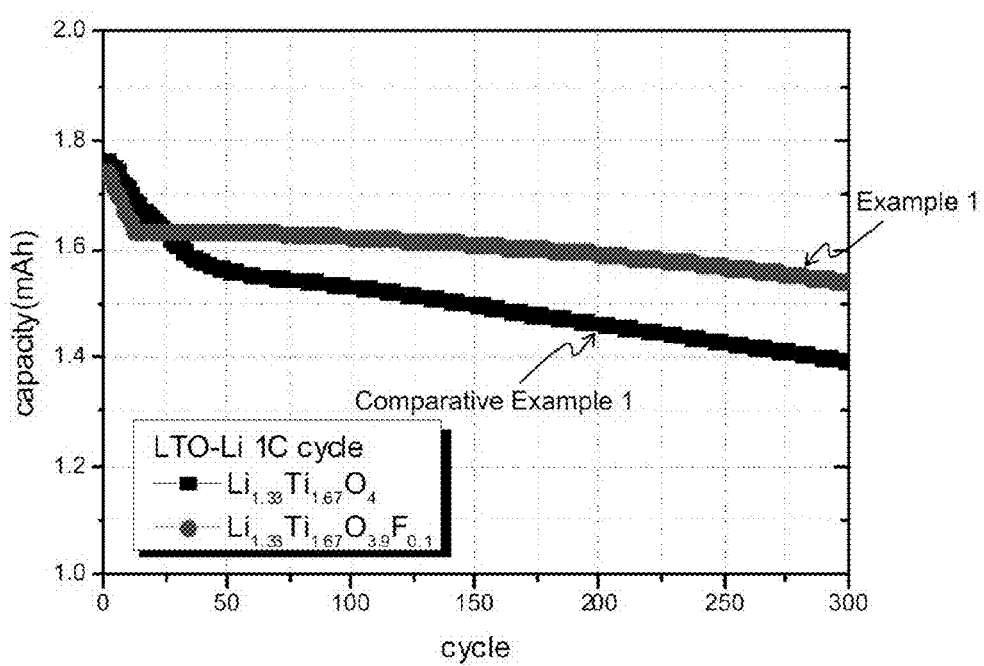
FIG. 2 is a curve showing lifespan of batteries according to non-limiting Examples and Comparative Examples of the present invention.

The batteries of Example 1 and Comparative Example 1 were subjected to charge and discharge testing at 25° C. under 0.1 C charge and 0.1 C discharge conditions. As can be seen from FIG. 2, Example 1 achieved a longer lifespan than Comparative Example 1.

Specifically, Comparative Example 1 maintained a level lower than 80% of an initial capacity after 300 charge/discharge cycles, but Example 1 maintained a level not lower than 80% of an initial capacity after 300 charge/discharge cycles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An anode active material for secondary batteries enabling intercalation and deintercalation of lithium ions, the anode active material comprising lithium metal oxide containing a halogen atom, wherein the lithium metal oxide is represented by the following Formula (1):

$$Li_aM'_bO_{4-c}A_c \qquad (1)$$

wherein M' is at least one element selected from the group consisting of Ti, Sn, Cu, Pb, Sb, Zn, Fe, In, Al and Zr;
a and b are determined according to an oxidation number of M' within ranges of $0.1 \leq a \leq 4$ and $0.2 \leq b \leq 4$;
c is determined according to an oxidation number within a range of $0 < c < 0.2$; and
A is at least one negative univalent or bivalent anion.

2. The anode active material according to claim 1, wherein the halogen atom substitutes for a part of oxygen of the lithium metal oxide.

3. The anode active material according to claim 1, wherein the oxide of Formula (1) is represented by the following Formula (2):

$$Li_aTi_bO_{4-c}A_c \qquad (2)$$

wherein $0.5 \leq a \leq 3$ and $1 \leq b \leq 2.5$;
c is determined according to an oxidation number within a range of $0 < c < 0.2$; and
A is at least one negative univalent or bivalent anion.

4. The anode active material according to claim 3, wherein the lithium metal oxide is $Li_{1.33}Ti_{1.67}O_{4-c}A_c$ or $LiTi_2O_{4-c}A_c$.

5. The anode active material according to claim 1, wherein the halogen atom is at least one selected from the group consisting of fluorine (F), chlorine (Cl), bromine (Br), iodine (I) and astatine (At).

6. The anode active material according to claim 1, wherein the lithium metal oxide is provided as a secondary particle formed of agglomerated primary particles.

7. The anode active material according to claim 6, wherein the secondary particle has a particle diameter of 200 nm to 30 μm.

8. The anode active material according to claim 1, wherein a content of the halogen atom is not lower than 0.1% by weight and is not higher than 5% by weight, based on the total weight of the lithium metal oxide.

9. A lithium secondary battery comprising an electrode assembly inserted into a battery case, wherein the electrode assembly comprises an anode comprising the anode active material according to claim 1, a cathode and a polymer membrane, and has a structure in which the polymer membrane is interposed between the cathode and the anode.

10. The lithium secondary battery according to claim 9, wherein the lithium secondary battery is a lithium ion battery.

11. The lithium secondary battery according to claim 9, wherein the lithium secondary battery is a lithium ion polymer battery.

12. The lithium secondary battery according to claim 9, wherein the lithium secondary battery is a lithium polymer battery.

13. The lithium secondary battery according to claim 9, wherein the lithium secondary battery maintains a level not lower than 80% of an initial capacity after 300 charge/discharge cycles under 1 C charge and discharge conditions at 25° C.

* * * * *